3,058,954
CONDENSATION PRODUCTS OF PHENOL, POLY-
CYCLIC PHENOLS AND FORMALDEHYDE
Gordon E. Brown, Seattle, Charlton R. Cox, Bellevue, and George A. Kennar, Seattle, Wash., assignors to Monsanto Chemical Company, St. Louis, Mo., a corporation of Delaware
No Drawing. Filed Sept. 22, 1958, Ser. No. 762,205
4 Claims. (Cl. 260—51)

This invention relates to liquid phenolic resins. More particularly the invention relates to liquid phenolic resins particularly adapted for use as plywood adhesives and binders for hardboard and chipboard.

Liquid phenol-formaldehyde resins have enjoyed considerable success as plywod adhesives and as binders for hardwood and chipboard. However, their use in these end products has been limited due to the need for careful and accurate control of the processes to prevent overpenetration into the wood particles or plywood veneers.

One object of this invention is to provide new liquid phenolic resins.

A further object is to provide liquid phenolic resins particularly suitable for use as plywood adhesives and binders for hardboard and chipboard.

These and other objects are attained by condensing phenol with formaldehyde and a phenylphenol or mixture of phenylphenols.

The following examples are given in illustration of the products and processes of this invention. Where parts are mentioned, they are parts by weight.

*Example I*

Mix 100 parts of phenol with 6 parts of a mixture of phenylphenols obtained from vanillin still bottom, 95 parts of formalin (37% formaldehyde) and 16 parts of 50% aqueous sodium hydroxide. Heat the mixture at 210° F. for ¾ to 1 hour to a viscosity of 45–65 on the MacMichael 30 d at 70° F. Add 76 parts of formalin and continue the reaction at 180° F. to a viscosity of 35 on the MacMichael 26 d at 70° F. The product is a liquid phenolic resin comprising an aqueous alkaline solution of a cocondensation product of phenol-formaldehyde and the phenylphenol mixture.

A particle of chipboard is prepared by blending the liquid resin with wood particles and a small amount e.g., 0.5 to 3% by weight, based on the particles, of a hydrocarbon wax. The blend is then pressed at 250–350° F. and a pressure of 2–300 p.s.i. The board may be cured while under pressure or it may be removed after partial curing and the curing may be completed in a hot stack or oven. The chipboard thus prepared has a specific gravity of 0.65 to 0.70, a modulus of rupture of 1400 to 1800 and a water absorption of 6 to 10% by weight.

The specific gravity, modulus of rupture, and water absorption varies with the amount of resin solids added to the wood particles and the press cycle used.

When the amount of phenylphenol mixture in Example I is raised to 12 to 15 parts, similar results are obtained.

When all of the formalin is added to the original reaction mixture in one portion, a liquid phenolic resin is obtained which can be used to make a chipboard. However, the properties of the board are somewhat inferior to those of a board made with the liquid phenolic resin by the 2-stage formalin addition process.

When the phenolyphenol mixture of Example I is replaced by a similar mixture obtained from the still bottoms of a crude phenol purification still, similar results are obtained except that there is slightly less flow of the resin in the formation of the chipboard. This requires minor alteration in the conditions for preparing the chipboard to attain optimum results.

For plywood adhesives a larger proportion of phenylphenol is used together with a different reaction cycle.

*Example II*

Mix 33 parts of a phenylphenol mixture obtained from vanillin still bottoms with 172 parts of formalin (37% formaldehyde) and 14 parts of 50% aqueous sodium hydroxide. Keep the mixture at 70–80° F. for at least 4 hours with constant agitation. Then add 100 parts of phenol to the mixture and heat the mixture to reflux temperature. Continue the heating until a 125° F. hydrophobe point is reached. At this point add about 25 parts of 50% aqueous sodium hydroxide and continue heating at reflux temperature until the reaction mixture is quite viscous. Finally add about 25 parts of 50% aqueous sodium hydroxide and heat at reflux for a few minutes to insure complete dispersion of the sodium hydroxide throughout the reaction mixture. The product is a liquid phenolic resin having a viscosity of about 500 centipoises at 40% solids by weight.

Thirteen-sixteenth inch fir plywood prepared by standard procedures with the liquid resin of Example II using a glue spread of 60 lbs./MGDL, an assembly time of 10 minutes and a press time of 5½ minutes at 300° F. shows excellent adhesion of the various plies to each other.

When phenylphenol mixtures from phenol still bottoms are substituted for the mixture used in Example II, similar liquid resins are obtained which give excellent adhesion in fir plywood panels at assembly times of 3 to 20 minutes.

If Example II is repeated without the steeping step (4 hours at 70–80° F.), the resulting liquid resin gives poor adhesion when used as a plywood glue.

The phenylphenols of this invention are polyphenyl compounds containing at least one phenolic hydroxyl group and at least one unsubstituted o- or p-position. Compounds such as biphenyls, terphenyls, quaterphenyls, quinquophenyls, hexaphenyls containing from 1 to 4 phenolic hydroxyl groups may be substituted for the phenylphenol mixtures shown in the examples. Best results are obtained when one phenolic hydroxyl group is present for each 170–250 units of molecular weight.

The phenylphenols are rarely prepared as pure compounds but are obtained as still bottoms in the distillation purification of crude phenolic materials. The still bottoms obtained from the distillation of crude vanillin are mixtures of the phenylphenols which mixtures are solids having a softening point of about 180° F. As the temperature is raised the viscosity of the melt decreases rapidly from about 10,000 centipoises at 230° F. to about 650 centipoises at 320° F. They average one phenolic hydroxyl group for 200–236 equivalent molecular weight. The still bottoms obtained from the distillation of crude phenol are somewhat harder and have slightly higher higher softening temperatures. A typical analysis of such still bottoms shows about 20% o-phenylphenol, about 11% p-phenylphenol with the balance being higher molecular weight phenylphenols.

Even though both phenol and the still bottoms are solids, a mixture of the two is liquid at room temperature. Such a liquid may be used to prepare the resins of this invention.

Depending on the properties desired in the final product from 3–50 parts by weight of the phenylphenol or phenylphenol mixture are used for each 100 parts of phenol. For dry and damp process hardboard and chipboard end use, the phenylphenol should be restricted to from 3 to 15 parts. For plywood adhesives the amount of phenylphenol should be increased to 15 to 40 parts.

The amount of formaldehyde to be used may range from about 50 to about 150 parts per 100 parts of phenol. Depending on the properties desired in the end product the formaldehyde may be added in increments without a steeping process or it may be added all at once to the phenylphenol accompanied by steeping at 60–120° F. for a minimum of one hour and followed by the addition of the remainder of the reaction ingredients. The formaldehyde is generally used in the form of the commercial aqueous solution known as formalin (37% formaldehyde). Paraform or other polymeric forms of formaldehyde may be used providing sufficient water is added to dilute the reaction components to the desired final solids content. The water should be added prior to the steeping step.

The catalyst used to prepare the resins of this invention is preferably sodium hydroxide. It should be used in amounts ranging from 4 to 50 parts per 100 parts of phenol. For resins to be used for particle board or dry process hardboard, not over 10 parts of sodium hydroxide should be used and all of the catalyst may be charged to the reaction vessel at the beginning of the reaction. For plywood adhesives or wet process hardboard a higher alkali content is desirable but the alkali should be added in at least three increments with suitable reaction periods between each addition. Other alkaline catalysts may be used in place of the sodium hydroxide.

When the reaction is carried out without the incremental addition of catalyst, the end point is determined by measuring the viscosity of the reaction medium. An end point of 20–50 on a MacMichael 26 d wire at 70° F. is desirable. The MacMichael viscosity test to be used is described in detail in U.S. 2,437,981. When the reaction is carried out with incremental addition of catalyst there are two end points to consider. The first catalyst addition comprises from 10 to 30% of the total catalyst and the reaction is carried out at reflux temperature to a hydrophobe point at 125° F., i.e., until the reaction mixture will form two phases below 125° F. but will be homogeneous above 125° F. The second addition of catalyst is conveniently one-half of the remaining desired amount. After addition of this catalyst the reaction is continued at reflux temperature until the reaction mixture becomes quite viscous. The end point is not sharp nor particularly critical. However, agitation is maintained throughout the reaction and an increase in viscosity is readily noted.

The liquid resins of this invention are aqueous alkaline solutions of co-condensation products of phenol, phenylphenols and formaldehyde containing 35–60% solids. The condensation products are in the fusible stage and may be cured to the infusible insoluble stage at temperatures above 200° F. Analysis of the liquid resin by paper chromatography indicates clearly that the phenylphenols are chemically combined.

Various conventional additives may be incorporated in the liquid resins. Among such additives are organic and inorganic particulate and fibrous fillers, colorants, lubricants, waxes, mold resistant agents, etc.

The foregoing is given in illustration of this invention. Many variations may be made in the products and processes described without departing from the spirit and scope of the invention.

What is claimed is:

1. A process for preparing a liquid condensation product of phenol, formaldehyde and at least one polycyclic phenol containing 2–6 benzene rings and having 1–4 phenolic hydroxyl groups attached to said rings, at least one of the positions ortho and para to at least one of said hydroxyl groups being unsubstituted, in the presence of 4–50 parts by weight of an alkaline catalyst, said process comprising steeping 3–50 parts by weight of the polycyclic phenol with 50–150 parts by weight of formaldehyde, part of the catalyst and water for at least one hour at 60–120° F., adding 100 parts by weight of phenol, heating the reaction mixture thus formed to reflux temperature to a 125° F. hydrophobe end point, adding a second portion of the catalyst and continuing the heating until the reaction mixture becomes viscous, adding the remaining portion of the catalyst, continuing the heating until the last portion of catalyst is dispersed and then cooling the reaction mixture.

2. A liquid phenolic resin comprising the aqueous alkaline condensation product of 100 parts by weight of phenol, 50–150 parts by weight of formaldehyde and 3–50 parts by weight of at least one polycyclic phenol containing 2–6 benzene rings and having 1–4 phenolic hydroxyl groups attached to said rings, at least one of the positions ortho and para to at least one of said hydroxyl groups being unsubstituted; said condensation product having been prepared by (a) steeping the polycyclic phenol with the formaldehyde in the presence of an alkaline catalyst and water for at least one hour at 60–120° F., (b) adding the phenol and heating the reaction mixture thus formed to reflux temperature to 125° F. hydrophobe end point, (c) adding a second portion of the alkaline catalyst and continuing the heating until the reaction mixture becomes viscous, (d) adding further alkaline catalyst to bring the total thereof present to 4–50 parts by weight and continuing the heating until the last portion of catalyst is dispersed, and (e) then cooling the reaction mixture.

3. A liquid phenolic resin as in claim 2 wherein the polycyclic phenol component is vanillin still bottoms characterized by a softening temperature of about 180° F., a melt viscosity of about 10,000 centipoises at 230° F., and a melt viscosity of about 650 centipoises at 320° F.

4. A liquid phenolic resin as in claim 2 wherein the polycyclic phenol component is phenol still bottoms characterized by containing about 20% by weight of ortho-phenylphenol and about 11% by weight of para-phenylphenol.

References Cited in the file of this patent

UNITED STATES PATENTS

| | | |
|---|---|---|
| 2,112,022 | Honel | Mar. 22, 1938 |
| 2,321,626 | Rosenblum | June 15, 1943 |
| 2,736,718 | Webber | Aug. 2, 1952 |

FOREIGN PATENTS

| | | |
|---|---|---|
| 577,561 | Great Britain | May 23, 1943 |